(12) United States Patent
Ohshino et al.

(10) Patent No.: US 12,291,159 B2
(45) Date of Patent: May 6, 2025

(54) KNEE AIRBAG DEVICE

(71) Applicant: Autoliv Development AB, Vargarda (SE)

(72) Inventors: Masaki Ohshino, Kanagawa (JP); Teppei Hotta, Kanagawa (JP); Shota Inoue, Kanagawa (JP); Satoru Arai, Kanagawa (JP)

(73) Assignee: Autoliv Development AB, Vargarda (SE)

( * ) Notice: Subject to any disclaimer, the term of this patent is extended or adjusted under 35 U.S.C. 154(b) by 0 days.

(21) Appl. No.: 18/263,477

(22) PCT Filed: Jan. 24, 2022

(86) PCT No.: PCT/JP2022/002419
§ 371 (c)(1),
(2) Date: Jul. 28, 2023

(87) PCT Pub. No.: WO2022/168656
PCT Pub. Date: Aug. 11, 2022

(65) Prior Publication Data
US 2024/0083380 A1    Mar. 14, 2024

(30) Foreign Application Priority Data

Feb. 3, 2021 (JP) ................ 2021-015436

(51) Int. Cl.
*B60R 21/206* (2011.01)
*B60R 21/215* (2011.01)
*B60R 21/231* (2011.01)

(52) U.S. Cl.
CPC .. *B60R 21/206* (2013.01); *B60R 2021/21506* (2013.01); *B60R 2021/21537* (2013.01); *B60R 2021/23169* (2013.01)

(58) Field of Classification Search
CPC ........ B60R 21/206; B60R 2021/21506; B60R 2021/21537; B60R 2021/23169
See application file for complete search history.

(56) References Cited

U.S. PATENT DOCUMENTS 6,631,920 B1 * 10/2003 Webber ................ B60R 21/206
280/752
9,669,793 B2 * 6/2017 Jung ..................... B60R 21/237
(Continued)

FOREIGN PATENT DOCUMENTS

JP      2000-247199 A    9/2000
JP      2003-205814 A    7/2003
(Continued)

*Primary Examiner* — Jason D Shanske
*Assistant Examiner* — Matthew James O'Neill
(74) *Attorney, Agent, or Firm* — Foley & Lardner LLP

(57) ABSTRACT

A knee airbag device including an airbag cushion, a storage case in which is formed a horizontally long opening part where the expanded and deployed airbag cushion pops outs, a first flap for covering the airbag cushion exposed through the opening part such that the airbag cushion is retained in the storage case, and having a first weak part that breaks when pressed by the airbag cushion during expansion and deployment, and a second flap, which is a component with a larger dimension in a length direction than the first flap and for covering an outer surface of the first flap so as to transverse in a short direction of the opening part a center part of the airbag cushion in a lateral direction, the second flap having a second weak part that breaks when pressed by the airbag cushion after rupture of the first weak part.

11 Claims, 13 Drawing Sheets

(56) References Cited

U.S. PATENT DOCUMENTS

| | | | | |
|---|---|---|---|---|
| 2007/0138779 A1* | 6/2007 | Kwon | ................... | B60R 21/205 |
| | | | | 280/743.2 |
| 2009/0152842 A1* | 6/2009 | Benny | ................... | B60R 21/201 |
| | | | | 280/728.3 |
| 2015/0115577 A1* | 4/2015 | Miura | ................. | B60R 21/2334 |
| | | | | 280/728.2 |

FOREIGN PATENT DOCUMENTS

| | | |
|---|---|---|
| JP | 2007-45241 A | 2/2007 |
| JP | 2010-274840 A | 12/2010 |
| WO | 2010/050009 A1 | 5/2010 |

\* cited by examiner

KNEE AIRBAG DEVICE

TECHNICAL FIELD

The present invention relates to a knee airbag device and the like for protecting a knee of an occupant.

BACKGROUND TECHNOLOGY

Conventionally, a knee airbag device for protecting a knee of an occupant when an impact is applied to a vehicle, such as when the vehicle is in a collision or the like, is known. Patent Document 1 describes a knee protection device as this type of device.

Specifically, the knee protection device described in Patent Document 1 has a case for storing an airbag and an inflator, and a cover for covering a vehicle rear side of the case, and is mounted below a steering column on a front side of a knee of a driver. In this device, the airbag expands when expansion gas discharged from the inflator flows into the airbag. At this time, the airbag pushes a door part of the cover to break an intended breakage part, causing the door part to open. The airbag expands and deploys along a lower surface of a column cover.

PRIOR ART DOCUMENTS

Patent Documents

Patent Document 1: Japanese Unexamined Patent Application 2003-205814

SUMMARY OF THE INVENTION

Problem to be Solved by the Invention

Knee airbag devices have difficulty in increasing the width dimension of the airbag cushion due to limitations in a vehicle interior structure, and the like. Therefore, a width dimension of the airbag cushion may be approximately the same as or smaller than a space between the knees of an occupant. Furthermore, the space in front of the knees of the occupant is relatively small for airbag cushion expansion and deployment. Therefore, conventionally, depending on the position of a leg of an occupant, the airbag cushion may not deploy in front of an occupant's knees and may enter between the knees, preventing a desired restraining performance from being achieved.

In view of the foregoing, an object of the present invention is to provide a knee airbag device in which it is difficult for an airbag cushion to enter between knees of an occupant during expansion and deployment, and that can stably restrain a knee from a front side.

Means for Solving the Problem

In order to solve the aforementioned problems, the present invention provides a knee airbag device for protecting a knee of an occupant, including: an airbag cushion stored in front of the knee of the occupant for expanding and deploying toward the knee side; an inflator for injecting expansion gas to expand the airbag cushion; a storage case for storing the airbag cushion, in which is formed an opening part through which the airbag cushion that has expanded and deployed by the expansion gas pops out; a first flap for covering the airbag cushion exposed through the opening part, such that the airbag cushion is retained in the storage case, and having a first weak part that breaks when pressed by the airbag cushion during expansion and deployment; and a second flap, which is a component with a larger dimension in a length direction than the first flap, for covering an outer surface of the first flap so as to transverse in an up-down direction or front-rear direction a center part of the airbag cushion in a lateral direction, the second flap having a second weak part that breaks when pressed by the airbag cushion after rupture of the first weak part. Note that with respect to the "up-down direction or front-rear direction", if the inclination angle is 45° in an oblique direction, it can be said to be both an up-down direction and front-rear direction. If the inclination angle is not 45°, it can be said to be a front-rear direction if the angle is near 0°, and up-down direction if the angle is near 90°.

The present invention may adopt a configuration in which notches are formed on both sides of the second flap in a width direction at the transversing part that transverses the center part, which are recessed toward the center in the width direction.

The present invention may adopt a configuration in which the notches are formed in a shape recessed in a curved manner toward the center in the width direction in a front surface view of the opening part.

The present invention may adopt a configuration in which the second flap has a pair of attachment parts for attaching the second flap to a vehicle side and a transversing part extending between the pair of attachment parts and transversing the center part, one of the pair of attachment parts is attached to a first flap attachment part provided on one side of the transversing part in a transverse direction of the storage case, and the other of the pair of attachment parts is attached to a second flap attachment part on the other side in the transverse direction of the storage case.

The present invention may adopt a configuration in which one end side of the first flap is attached to the first flap attachment part, and the other end side of the first flap is attached to the second flap attachment part.

The present invention may adopt a configuration in which at least one of the first flap attachment part and second flap attachment part is disposed near an edge part of the opening part.

The present invention may adopt a configuration in which the second flap is configured by integrating a first fabric attached to the first flap attachment part and a second fabric attached to the second flap attachment part.

The present invention may adopt a configuration in which the first flap is provided so as to transverse the opening part, and the first weak part is positioned in the center or near the center of the opening part in the transverse direction of the first flap.

The present invention may adopt a configuration in which the second weak part is positioned near an edge part of the opening part.

The present invention may adopt a configuration in which in the second flap, the transversing part that transverses the center part has an overlapping part where the transversing part is folded back a plurality of times in the length direction so as to overlap upon itself.

The present invention may adopt a configuration in which the overlapping part has a stitch part in which the fabric of the mutually overlapping portions of the transversing part are stitched together such that the folded state is maintained, and the stitch part breaks before the second weak part.

Effect of the Invention

The present invention has: a first flap for retaining an airbag cushion in a storage case; and a second flap for covering an outer surface of the first flap so as to transverse in an up-down direction or front-rear direction a center part of the airbag cushion in a lateral direction. When expansion gas is injected from an inflator, the airbag cushion begins to expand and deploy, and the first flap breaks at the first weak part. In this manner, the second flap restrains the deployment of the center part of the airbag cushion until the second flap spreads and breaks at a second weak part. This suppresses the airbag cushion from deploying to a knee side and promotes deployment to an outer side in the lateral direction (e.g., a left-right direction of the vehicle). The airbag cushion spreads in the lateral direction as compared to a knee airbag device without a second flap.

Furthermore, in addition to the second flap, the present invention also has a first flap. Herein, the airbag cushion is usually stored in a folded and compressed state in the storage case. Therefore, if the first flap is not provided, the second flap will be pressed by the compression reaction force of the airbag cushion. On the other hand, the second flap is longer than the first flap and is attached in a relatively loosely taut or slack state with a length adjustment part, for example, a folded-back part. Therefore, when pushed by the compression reaction force described above, the second flap may further slacken, and the second weak part may not break at or near an intended break position. Thus, the deployment suppression described above may not be effective. In contrast, with the present invention, the first flap can suppress the second flap from slackening due to being pushed by the compression reaction force described above. Therefore, it is possible to provide a knee airbag device in which it is unlikely for an airbag cushion to enter between the knees of an occupant during expansion and deployment, and that can stably restrain the knees from the front side.

EMBODIMENTS OF THE INVENTION

Embodiments of the present invention are described below in detail with reference to the drawings. Note that the following embodiments are examples of the present invention, and are not intended to limit the scope of the present invention, the application, or the uses thereof.

Figure 1:
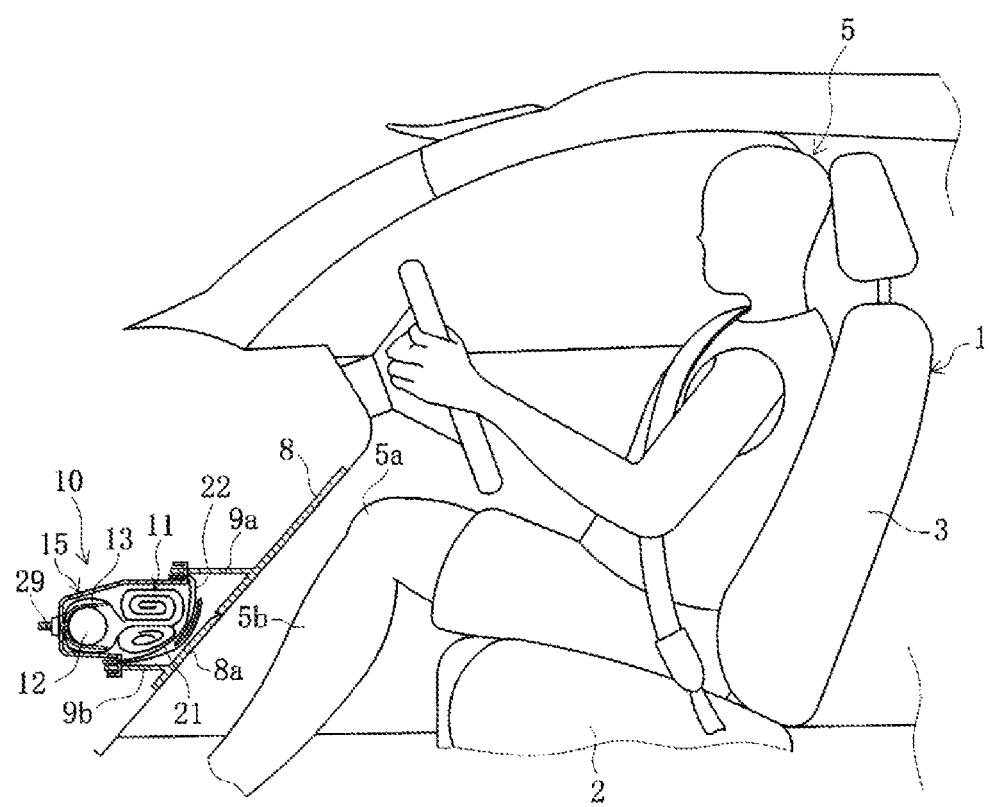
FIG. 1 is a schematic diagram depicting a condition in which a knee airbag device according to an embodiment is attached to a vehicle.

The present embodiment is a knee airbag device 10 for protecting a knee 5a of an occupant 5 seated on a seat 1 of a vehicle such as a car or the like. The knee airbag device 10 depicted in FIG. 1 is provided for a driver's seat. However, the knee airbag device 10 may be provided for another seat, such as a front passenger seat or the like. The knee airbag device 10 is provided in an instrument panel 8 of the vehicle, and when the vehicle is impacted, such as during a collision or the like, the airbag cushion 11 expands and deploys toward the occupant 5 to restrain the knee 5a of the occupant 5.

Note that in this specification, the terms "upper" and "upper side" refer to a head direction of the occupant 5 seated in a regular position in the seat 1 and "lower" and "lower side" refer to a foot direction of the occupant 5. Herein, the "regular position" refers to a position in a center of a seat cushion 2 of the seat 1 in the left-right direction with the back of the occupant 5 in contact with the backrest 3 from above and below. Furthermore, the terms "front" and "front side" refer to a front surface direction of the occupant 5 seated in the seat 1 in the regular position and "rear" and "rear side" refer to a back surface direction of the occupant 5. Furthermore, the terms "left" and "left side" refer to a left-hand direction of the occupant 5 seated in the seat 1 in the regular position, and "right" and "right side" refer to the right-hand direction of the occupant 5. Furthermore, the occupant 5 assumes an AM50 (a 50th percentile of an adult male in US) of a WorldSID (World Side Impact Dummy).

Configuration of Knee Airbag Device

The knee airbag device 10 is disposed on a back side of a lower panel 8a of the instrument panel 8, which is positioned in front of a shin 5b of the occupant 5, as depicted in FIG. 1. Herein, the lower panel 8a extends diagonally to the front and down in cross-sectional view. A first attachment member 9a and a second attachment member 9b protrude to the front from a back surface of the lower panel 8a. The first attachment member 9a and second attachment member 9b are formed in a plate shape and extend substantially horizontally. The first attachment member 9a and second attachment member 9b are spaced apart in the up-down direction. The knee airbag device 10 is attached to the first attachment member 9a and second attachment member 9b.

Figure 2:
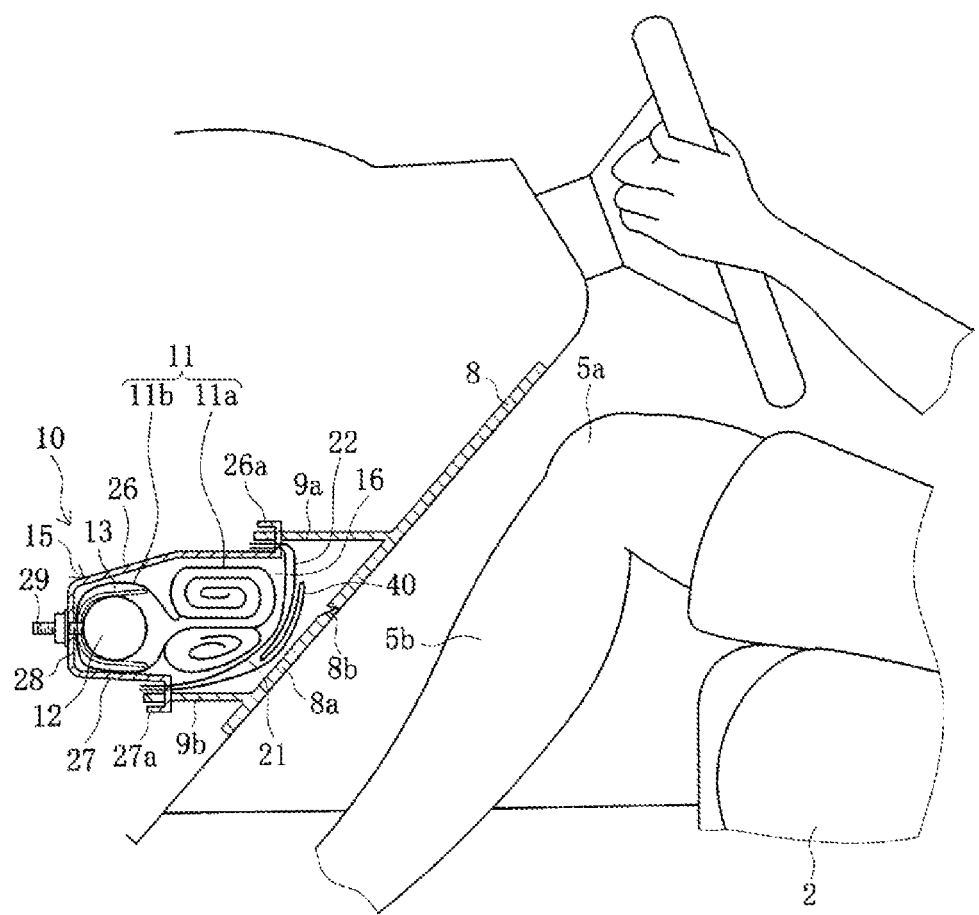
FIG. 2 is a schematic diagram of the knee airbag device according to the embodiment.
Figure 3:
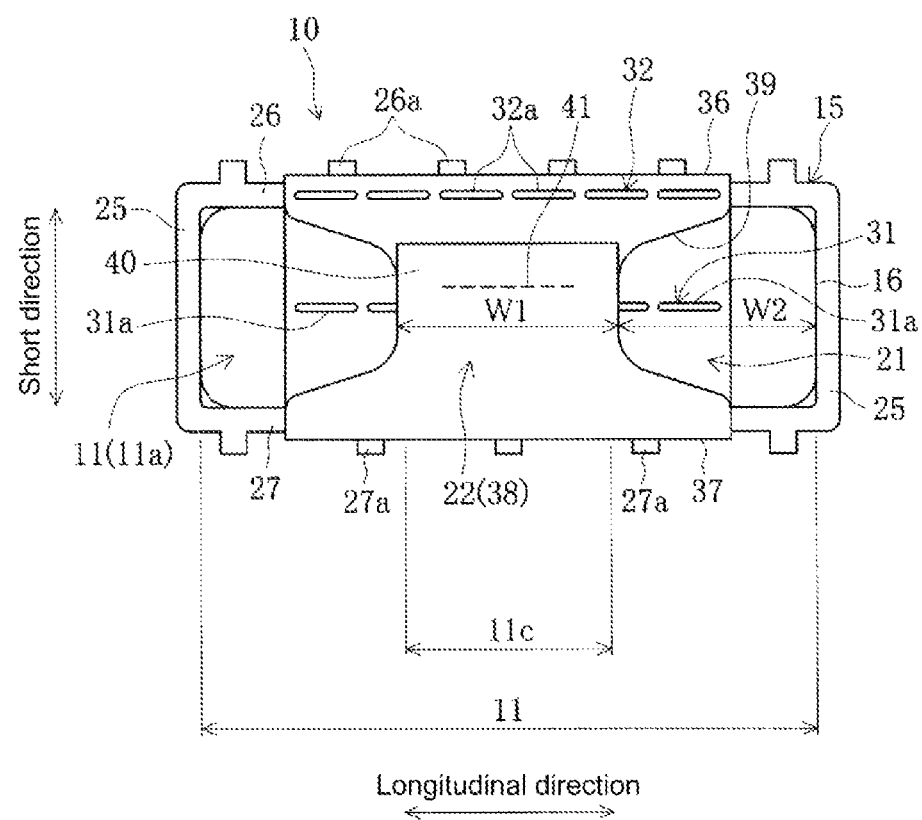
FIG. 3 is a schematic diagram in which the knee airbag device according to the embodiment is viewed from an opening part side.

As depicted in FIGS. 2 and 3, the knee airbag device 10 has: the cushion 11 stored in front of the knee 5a of the occupant 5 and expanded and deployed toward the knee 5a side; an inflator 12 for injecting expansion gas for expanding the airbag cushion 11; a storage case 15 for storing the airbag cushion 11; a first flap (folding retention flap) 21 for covering the airbag cushion 11 exposed from an opening part 16 of the storage case 15; and a second flap (inter-knee deployment suppression flap) 22 for covering an outer surface of the first flap 21. In present embodiment, the first flap 21 and the second flap 22 are doubly provided for the airbag cushion 11 in the stored state.

The storage case 15 is a box body in which a horizontally long opening part 16 is formed through which the airbag cushion 11, which is expanded and deployed by the expansion gas, pops out. The storage case 15 is attached to the back side of the lower panel 8a such that the opening part 16 faces the back surface of the lower panel 8a. The back surface of the lower panel 8a has a weak part 8b that breaks when pressed by the expansion pressure of the airbag cushion 11. The weak part 8b is weaker in strength than other portions in the lower panel 8a and can be formed, for example, by a straight groove extending in the left-right direction.

The storage case 15 is a box body having: an upper surface plate 26; a lower surface plate 27 facing the upper surface plate 26; a bottom surface plate 28 extending between a front end part of the upper surface plate 26 and a front end part of the lower surface plate 27; and a pair of side surface plates 25 extending between an end part of the upper surface plate 26 and an end part of the lower surface plate 27 in the left-right direction. The opening part 16 is formed between the rear end part of the upper surface plate 26 and the rear end part of the lower surface plate 27 in cross-sectional view. The upper surface plate 26 and lower surface plate 27 are formed in a rectangular shape in plan view. The upper surface plate 26 is longer in the front-rear direction between the upper surface plate 26 and the lower surface plate 27.

The storage case 15 is a box body having a horizontally long opening part 16. As depicted in FIG. 3, the length in the left-right direction is longer than the length in the up-down direction when viewed from the opening part 16 side in a condition attached to the back side of the lower panel 8a. Hereinafter, with respect to the storage case 15, the left-right direction in a front surface view from the opening part 16 side may be referred to as a longitudinal direction, and the up-down direction in the front surface view from the opening part 16 side may be referred to as a short direction.

In the storage case 15, a plurality of hooks 26a, 27a are provided on an outer surface of the upper surface plate 26 and outer surface of the lower surface plate 27, respectively. Each hook 26a, 27a is formed such that a tip end faces toward the bottom surface plate 28 side (front) (see FIG. 2) and is disposed near the outer side of the edge part of the opening part 16. The storage case 15 is attached to the first attachment member 9a by the plurality of hooks 26a on the upper surface plate 26 and to the second attachment member 9b by the plurality of hooks 27a on the lower surface plate 27. The first attachment member 9a has a plurality of through holes (not depicted) through which the plurality of hooks 26a are inserted during attachment. The second attachment member 9b has a plurality of through holes (not depicted) through which the plurality of hooks 27a are inserted during attachment.

Note that the plurality of hooks 26a of the upper surface plate 26 configure the first flap attachment part to which a first attachment part 36 of the second flap 22 is attached. The plurality of hooks 27a of the lower surface plate 27 configure the second flap attachment part to which a second attachment part 37 of the second flap 22 is attached. One end side of the first flap 21 is also attached to the plurality of hooks 26a serving as the first flap attachment part, and the other end side of the first flap 21 is attached to the plurality of hooks 27a serving as the second flap attachment part. In the present embodiment, each hook 26a, 27a is disposed near the outer side of the edge part of the opening part 16, making attachment of each flap 21, 22 easy.

The airbag cushion 11, inflator 12, and rectification plate 13 are attached to the bottom surface plate 28 by a stud bolt 29. The inflator 12 and rectification plate 13 are provided inside the airbag cushion 11. The inflator 12 is provided inward of the rectification plate 13. The rectification plate 13 is a plate material that rectifies the flow of gas injected from inflator 12 to the bag main body part 11a side of the airbag cushion 11. The rectification plate 13 extends from an attachment point of the stud bolt 29 toward the bag main body part 11a side.

The airbag cushion 11 in the stored state has: the bag main body part 11a, which is provided on the opening part 16 side in the storage case 15 in a folded state; and a bag end part 11b extending from the bag main body part 11a to the bottom surface plate 28 side (see FIG. 2). The bag main body part 11a protrudes slightly from the opening part 16 in a cross-sectional view. The bag main body part 11a is pressed down into the storage case 15 by the first flap 21. In the airbag cushion 11, the bag end part 11b is secured to the bottom surface plate 28 by the stud bolt 29.

Figure 4A:
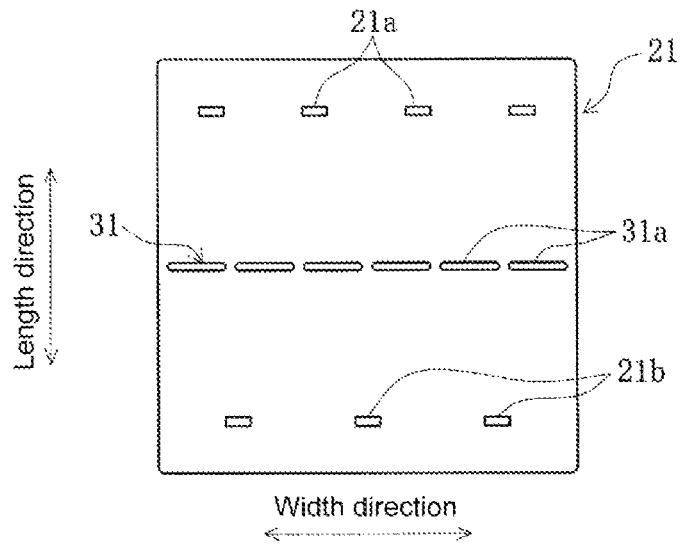
FIG. 4(a) is a plan view of a first flap of the knee airbag device according to the embodiment.
Figure 4B:
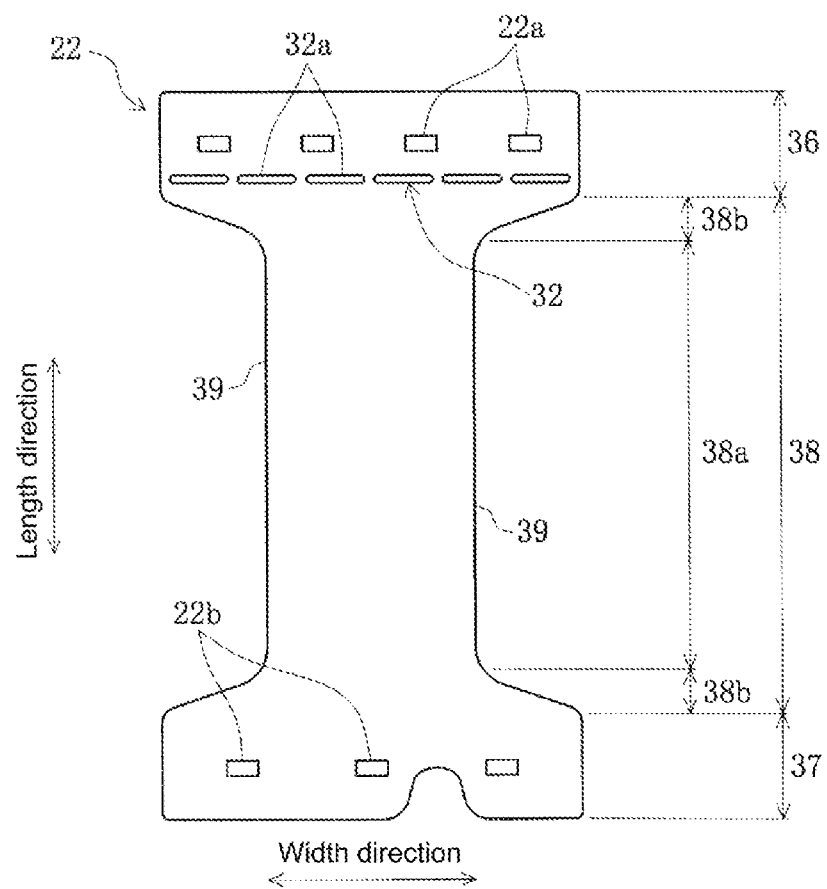
FIG. 4(b) is a plan view of a second flap.

Configurations of the first flap 21 and second flap 22 are described in further detail. FIGS. 4(a) and 4(b) depict the first flap 21 and second flap 22, respectively, spread out and laid flat on a flat surface.

The first flap 21 is a strip-shaped fabric material having required lengths in the width and length directions, respectively, as depicted in FIG. 4(a). Herein, the width direction of the first flap 21 is a direction in which the first flap 21 is oriented with the longitudinal direction of the storage case 15 when attached to the storage case 15. The length direction of the first flap 21 is a direction in which the first flap 21 is oriented with the short direction of the storage case 15 when attached to the storage case 15. These definitions for the width and length directions are the same for the second flap 22, as depicted in FIG. 4(b).

The first flap 21 is a fabric material (e.g., non-stretch material) for retaining the position and shape of the airbag cushion 11 in the stored state. The first flap 21 is formed as a straight strip, as depicted in FIG. 4(a). The width of the first flap 21 is constant. The length of the first flap 21 is approximately the same length as the dimension in the short direction of the storage case 15. Herein, "approximately the same length" means within +10% of the dimension in the short direction of the storage case 15. The first flap 21 is provided to cover the opening part 16 and retain the airbag cushion 11 in the storage case 15.

Each end part of the first flap 21 has a plurality of through holes 21a, 21b aligned in the width direction. The first flap 21 is attached to the storage case 15 by inserting the plurality of hooks 26a of the upper surface plate 26 through the plurality of through holes 21a at one end part and the plurality of hooks 27a of the lower surface plate 27 through the plurality of through holes 21b at the other end part. The first flap 21 transverse to the opening part 16 in the up-down direction (short direction) so as to contact a rear part of the airbag cushion 11 in the stored state.

The first flap 21 has a first weak part 31 that breaks when pressed by the airbag cushion 11. The first weak part 31 is configured of a plurality of slits 31a. Each slit 31a is an elongated through hole and extends in the width direction of the first flap 21. The plurality of slits 31a are aligned at a distance in the width direction of the first flap 21. The strength of the first weak part 31 in the first flap 21 is weaker than other portions, and when pushed by the airbag cushion 11 during expansion and deployment, the first weak part 31 breaks. With the first flap 21 attached to the storage case 15, the first weak part 31 is positioned at or near the center of the opening part 16 in the short direction (transverse direction) of the opening part 16. Therefore, the first weak part 31 breaks immediately after the airbag cushion 11 begins to expand and deploy.

The second flap 22 is a fabric material (e.g., non-stretch material or stretch material) for temporarily restricting the deployment of a center part 11c (see FIG. 3) of the expanding and deploying airbag cushion 11 toward the occupant 5. The second flap 22 is configured of a single piece of fabric material. The second flap 22 is formed as a straight strip, as depicted in FIG. 4(b). The second flap 22 covers the outer surface of the first flap 21 so as to transverse the center part 11c in the lateral direction of the airbag cushion 11 in the short direction (up-down direction) of the opening part 16.

The second flap 22 has: a first attachment part 36 with a plurality of through holes 22a; a second attachment part 37 with a plurality of through holes 22b; and a transversing part 38 extending between the pair of attachment parts 36, 37 and transversing the center part 11c of the airbag cushion 11. The second flap 22 is attached to the storage case 15 by inserting the plurality of hooks 26a of the upper surface plate 26 through the plurality of through holes 22a of the first attachment part 36 and the plurality of hooks 27a of the lower surface plate 27 through the plurality of through holes 22b of the second attachment part 37. Note that the through holes 22a, 22b of the second flap 22 are larger than the through holes 21a, 21b of the first flap 21. This makes attachment of the second flap 22 to the storage case 15 easy.

On both sides of the transversing part 38 in the width direction, a pair of notches 39 are formed symmetrically about a center line passing through the center position in the width direction and recessed toward the center in the width direction. Each notch 39 is formed in the shape of an abbreviated isopod trapezoid with an upper bottom and lower bottom facing each other in the width direction of the second flap 22 and narrowing toward the center side in the width direction. In the front view of the opening part 16 with the second flap 22 attached to the storage case 15, each notch 39 has a shape recessed in a curved manner toward the center in the width direction (see FIG. 3). The transversing part 38 is configured of a transversing part main body 38a of constant width and a pair of connecting parts 38b that are continuous at each end of the transversing part main body 38a and become wider approaching the attachment parts 36, 37.

The second flap 22 is adjusted to be approximately the same length as the first flap 21 by folding back a plurality of times (even number of times) in the longitudinal direction thereof to provide an overlapping part 40 where the transversing part 38 overlaps upon itself (see FIG. 2). The second flap 22 prior to providing the overlapping part 40 is larger in the dimension in the length direction than the first flap 21. The dimension of the second flap 22 in the length direction is preferably at least 1.2 times the dimension of the first flap 21 in the length direction, and even more preferably at least 1.8 times (e.g., double) the dimension of the first flap 21 in the length direction. The overlapping part 40 has a retaining part 41 that retains the folded back state. The retaining part 41 is configured of a stitch part in which the fabric of the mutually overlapping transversing part 38 (fabric from the frontmost side to the backmost side) is stitched together. In the overlapping part 40, the retaining part 41 extends in the lateral direction. The retaining part 41 breaks after the breakage of the first weak part 31 but prior to the breakage of a second weak part 32. Note that the retaining part 41 may have a configuration other than a stitch part.

The second flap 22 has a second weak part 32 that breaks when pressed by the airbag cushion 11, after rupture of the first weak part 31. The second weak part 32 is configured of a plurality of slits 32a. Each slit 32a is an elongated through hole and extends in the width direction of the second flap 22. The plurality of slits 32a are aligned at a distance in the width direction of the second flap 22. In the second flap 22, the strength of the second weak part 32 is weaker than other portions, and when pressed by the expansion pressure of the airbag cushion 11, the second weak part 32 breaks. With the second flap 22 attached to the storage case 15, the second weak part 32 is positioned near the upper surface plate 26 (near the edge part of the opening part 16) in the short direction of the opening part 16. The second weak part 32 is formed in the wider portion of the second flap 22. Specifically, in present embodiment, the second weak part 32 is formed in the first attachment part 36, which is wider than the transversing part 38, instead of in the narrower transversing part 38. The second weak part 32 is formed on a lower side of the line of the plurality of through holes 22a in the width direction in the first attachment part 36.

An example of a numerical value range will be described for the lateral dimension of the opening part 16 in front view. The dimensions of the opening part 16 of the storage case 15 and the airbag cushion 11 in the stored state are, for example, 20 cm to 30 cm. Dimension (width) W1 of the transversing part main body 38a of the second flap 22 is 5 cm to 10 cm, which is ⅙ to ⅓ of the stored airbag cushion 11. Furthermore, dimension W2 of an open portion not covered by the transversing part main body 38a is 5 cm to 10 cm on both the left and right.

Operation of Knee Airbag Device and Effect of the Embodiment

Figure 5:
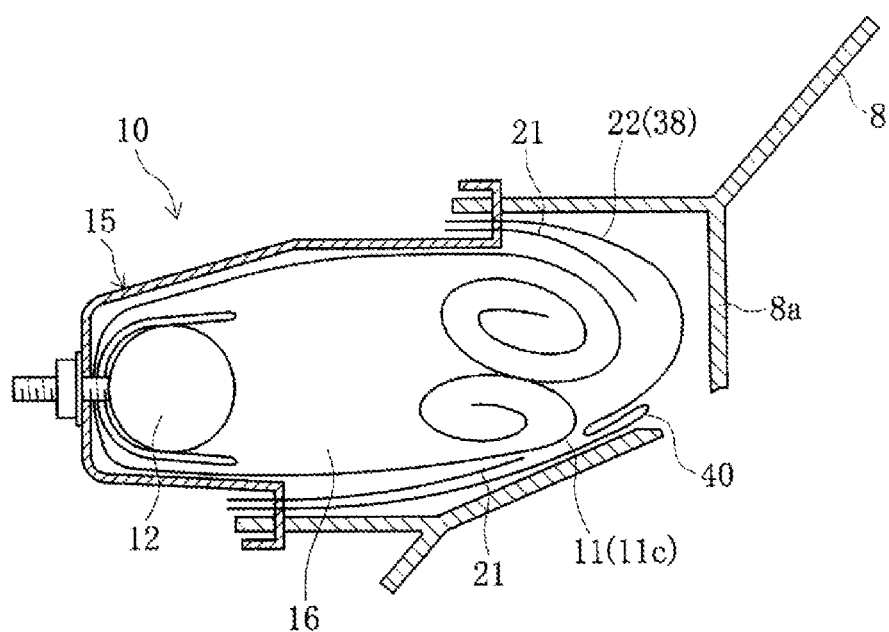
FIG. 5 is a schematic diagram of the knee airbag device according to the embodiment, depicting a condition immediately after breakage of the first flap and a lower panel.

With reference to FIGS. 5 through 9, an operation of the knee airbag device 10 and an effect of the embodiment will be described. When an impact is applied to the vehicle such as when the vehicle is in a collision or the like, the inflator 12 that has received a signal from a sensor injects expansion gas that starts to expand and deploy the airbag cushion 11. In the knee airbag device 10, the first flap 21 is first pushed to the outer side by the expansion pressure of the airbag cushion 11 and breaks at the first weak part 31. Furthermore, the lower panel 8a is pushed to the outer side by the expansion pressure of the airbag cushion 11 and breaks at the weak part 8b. Furthermore, the lower panel 8a opens as the airbag cushion 11 expands, and the airbag cushion 11 expands to the outer side through the opening part in the lower panel 8a. FIG. 5 depicts the first flap 21 and lower panel 8a immediately after breaking.

Figure 6:
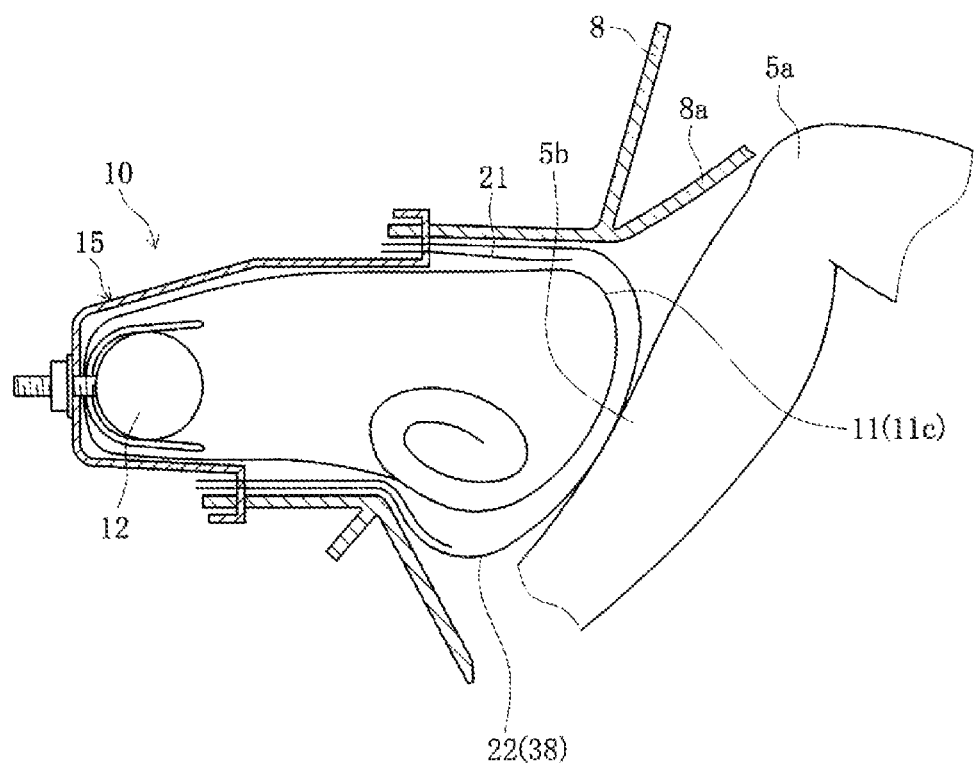
FIG. 6 is a schematic diagram of a knee airbag device according to the embodiment, depicting a condition in which an airbag cushion reaches a shin of an occupant.

Furthermore, when the first weak part 31 breaks, the expansion pressure of the airbag cushion 11 pushes the second flap 22 to the outer side. This causes the retaining part 41, which is configured of a stitch part, to break. The second flap 22 gradually extends to the outer side at a folded-back point, as depicted in FIG. 6. Furthermore, when the second flap 22 is fully extended to a certain extent, the second flap 21 suppresses the deployment of the center part 11c of the airbag cushion 11.

Figure 7:
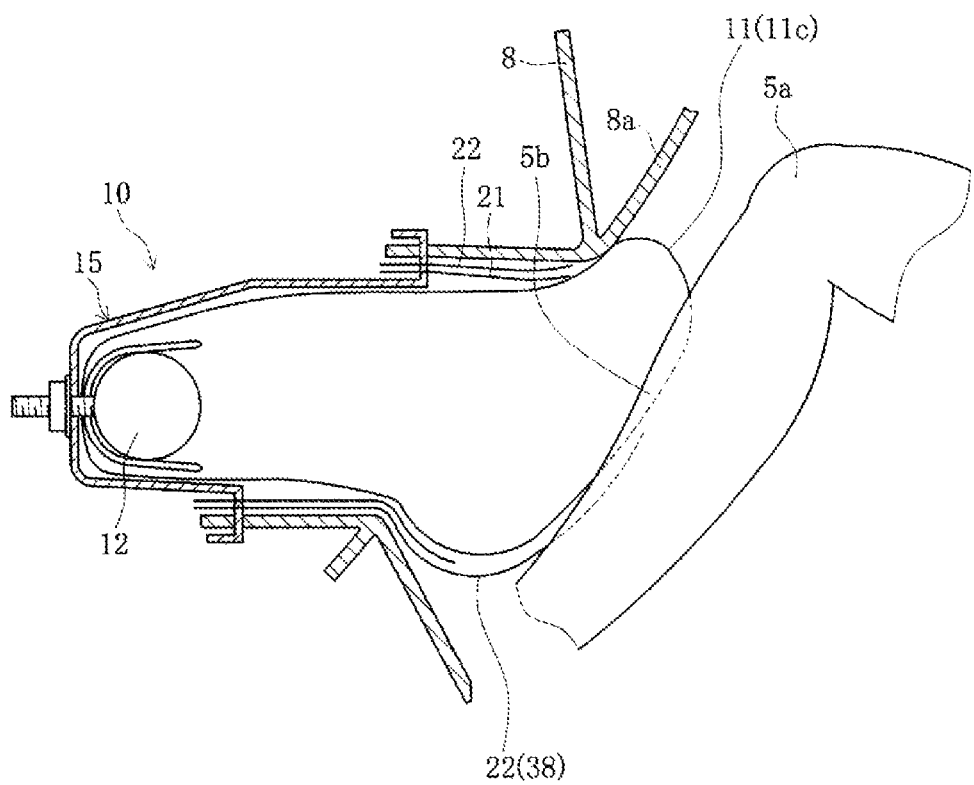
FIG. 7 is a schematic diagram of the knee airbag device according to the embodiment, depicting a condition immediately after breakage of a second weak part.

Furthermore, a tensile force acting on the second weak part 32 increases. Therefore, after a short time from the beginning of deployment suppression of the center part 11c, the second flap 22 breaks at the second weak part 32, as depicted in FIG. 7. The second flap 22 breaks at approximately the same time that the airbag cushion 11 impacts the shin 5b. Until this breakage, the deployment suppression of the center part 11c by the second flap 21 is made in a region from an installation position of the lower panel 8a to the shin 5b, in cross-sectional view. In the knee airbag device 10, when the second flap 22 breaks, the expansion and deployment of the airbag cushion 11 is completed immediately thereafter, and the right and left knees 5a are restrained by the airbag cushion 11.

In present embodiment, the transversing part 38 of the second flap 21 restrains the deployment of the center part 11c of the airbag cushion 11 until the second flap 22 spreads and the second flap 22 breaks. This suppresses the airbag cushion 11 from deploying to the knee 5a side and promotes deployment in the left-right direction of the vehicle. The airbag cushion 11 spreads in the lateral direction as compared to a knee airbag device without the second flap 22. Furthermore, a notch 39 recessed in the curved shape is formed on both sides in the width direction in the transversing part 38 of the second flap 22, and the notch 39 also facilitates spreading in the lateral direction of the airbag cushion 11.

Figure 8A:
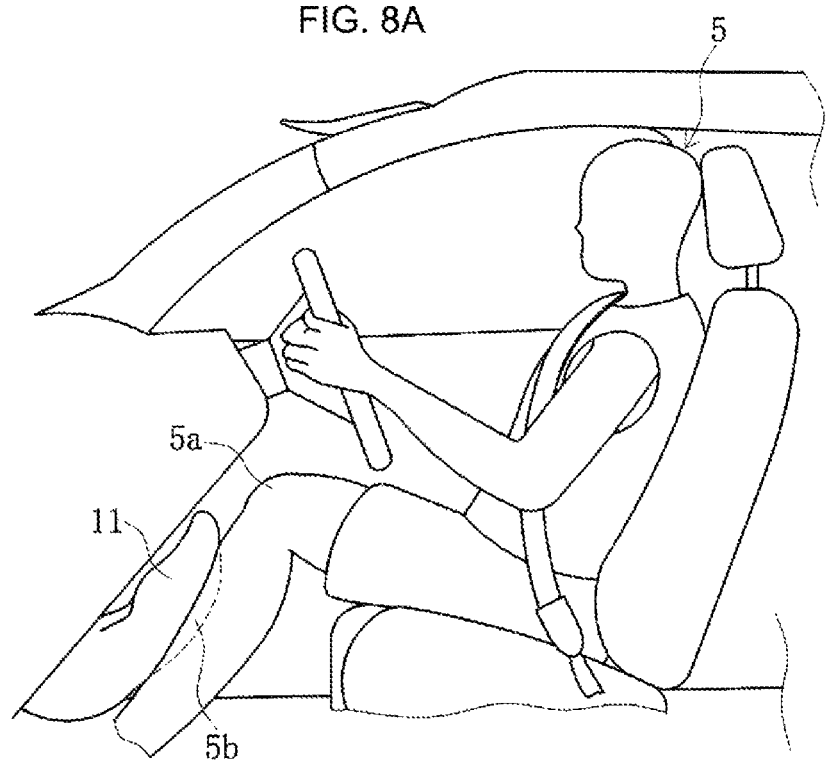
FIG. 8(a) is a diagram of a condition of the fully expanded and deployed airbag cushion of the knee airbag device according to the embodiment, as viewed from a side.
Figure 8B:
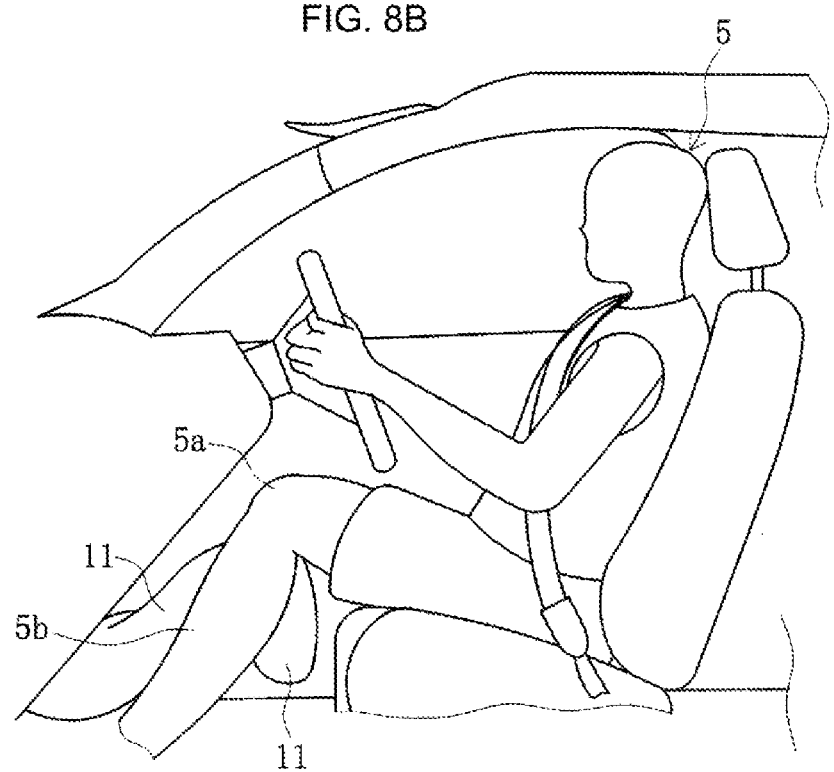
FIG. 8(b) is a diagram of a fully expanded and deployed airbag cushion of a knee airbag device without a second flap, as viewed from a side.
Figure 9A:
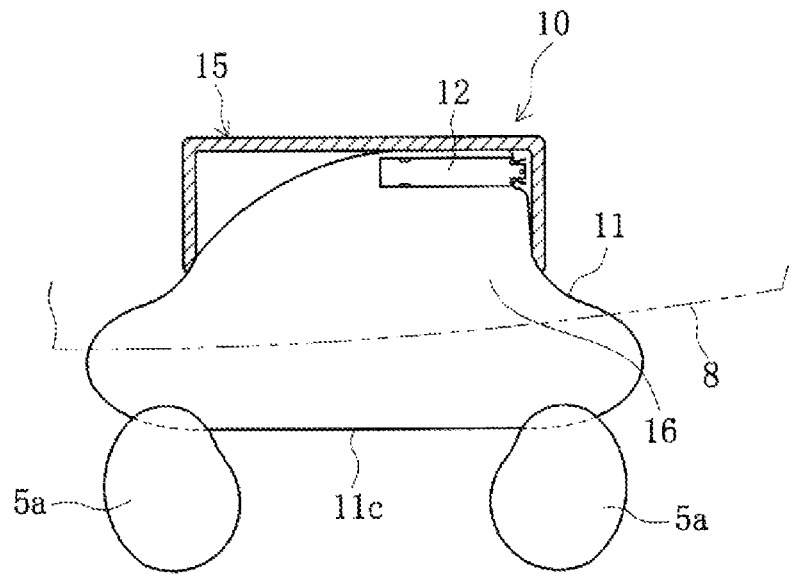
FIG. 9(a) is a diagram of a condition of the fully expanded and deployed airbag cushion of the knee airbag device according to the embodiment, as viewed from above.
Figure 9B:
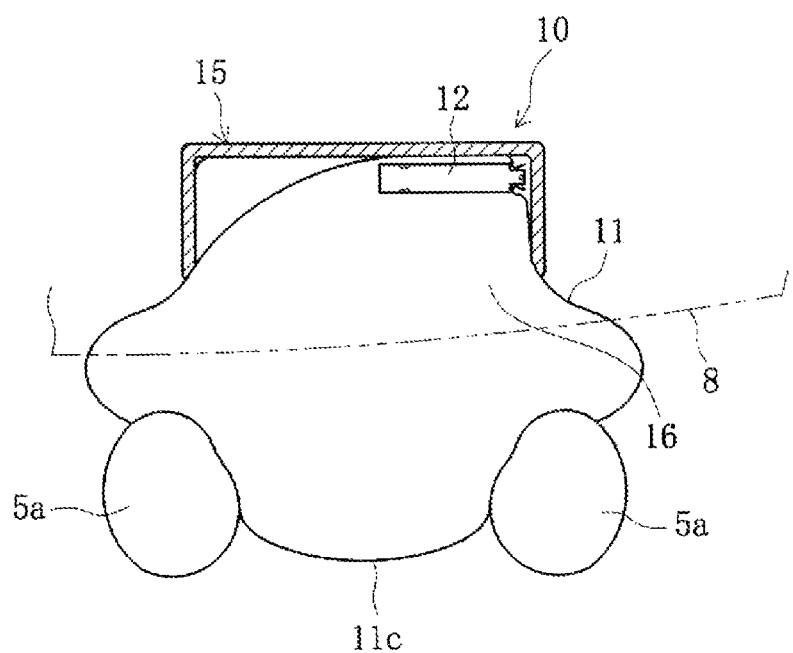
FIG. 9(b) is a diagram of the fully expanded and deployed airbag cushion of the knee airbag device without a second flap, as viewed from above.

Herein, FIGS. 8(a) and 9(a) depict states in which expansion and deployment are completed in the knee airbag device 10 according to present embodiment, and FIGS. 8(b) and 9(b) depict a state in which expansion and deployment is completed in the knee airbag device without the second flap 22. In a knee airbag device without the second flap 22, the airbag cushion 11 may enter between the knees 5a of the occupant 5, and the airbag cushion 11 may not sufficiently deploy on the front side of the knees 5a such that the knees 5a of the occupant 5 are restrained by the airbag cushion 11. This situation is more likely to occur with a small knee airbag device 10 where the lateral width of the opening part 16 of the storage case (20 cm to 30 cm) is shorter than the distance between the knees 5a. Note that the distance between the knees 5a of the occupant 5 is often 30 cm.

In contrast, the airbag cushion 11 spreads in the lateral direction according to present embodiment. Therefore, even if the knee airbag device 10 is small, it is difficult for the airbag cushion 11 to enter between the knees 5a of the occupant 5 during expansion and deployment, allowing the airbag cushion 11 to deploy stably on the front side of the knees 5a and stably restrain the knees 5a from the front side.

Furthermore, in addition to the second flap 22, the present embodiment also has the first flap 21. Therefore, as described above, the compression reaction force of the airbag cushion 11 in the stored state prevents the second flap 22 from slackening by being pushed. Therefore, at least two flaps 21, 22 can be provided to further stabilize and restrain the knee 5a from the front side.

Furthermore, the length of the second flap 22 is longer than the first flap 21 in the present embodiment. Herein, if the length of the second flap 22 is equal to the first flap 21, the deployment suppression timing of the center part 11c by the second flap 22 is too early, and the airbag cushion 11 spreads in the lateral direction on a side closer to the opening part 16. Therefore, the airbag cushion 11 may interfere with the instrument panel 8. In contrast, in the present embodiment, the longer second flap 22 delays the deployment suppression timing described above, such that the airbag cushion 11 spreads in the lateral direction on a side closer to the knee 5a and the interference described above is suppressed. The second flap 22 has a length dimension where the second weak part 32 breaks after the bag main body part 11a pops out from the installation position of the lower panel 8a (position before the weak part 8b breaks) during expansion and deployment of the airbag cushion 11. According to the present embodiment, it is possible to provide the knee airbag device 10 in which the airbag cushion 11 spreads smoothly in the lateral direction.

Furthermore, in the present embodiment, each flap attachment part 26a, 27a is used for the first flap 21 and second flap 22. Furthermore, each flap attachment part 26a, 27a is also used to attach the storage case 15 to the vehicle body side. This simplifies the configuration of the knee airbag device 10. Furthermore, each flap attachment part 26a, 27a is configured of three or more hooks. Therefore, it is difficult to cause deformation when each flap 21, 22 is pressed by the airbag cushion 11, and breakage of each weak part 31, 32 can be made to occur in a stable period at or near the intended breakage position.

Furthermore, in the present embodiment, the second weak part 31 is positioned near the edge part of the opening part 16. Therefore, for the second flap 22, the length from the second weak part 31 to the lower surface plate 27 side is longer, making it easier to provide an overlapping part 40. Furthermore, there is one overlapping part 40 in the present embodiment. In the present embodiment, work of adjusting the length of the second flap 22 is simple.

First Variation of the Embodiment

Figure 10:
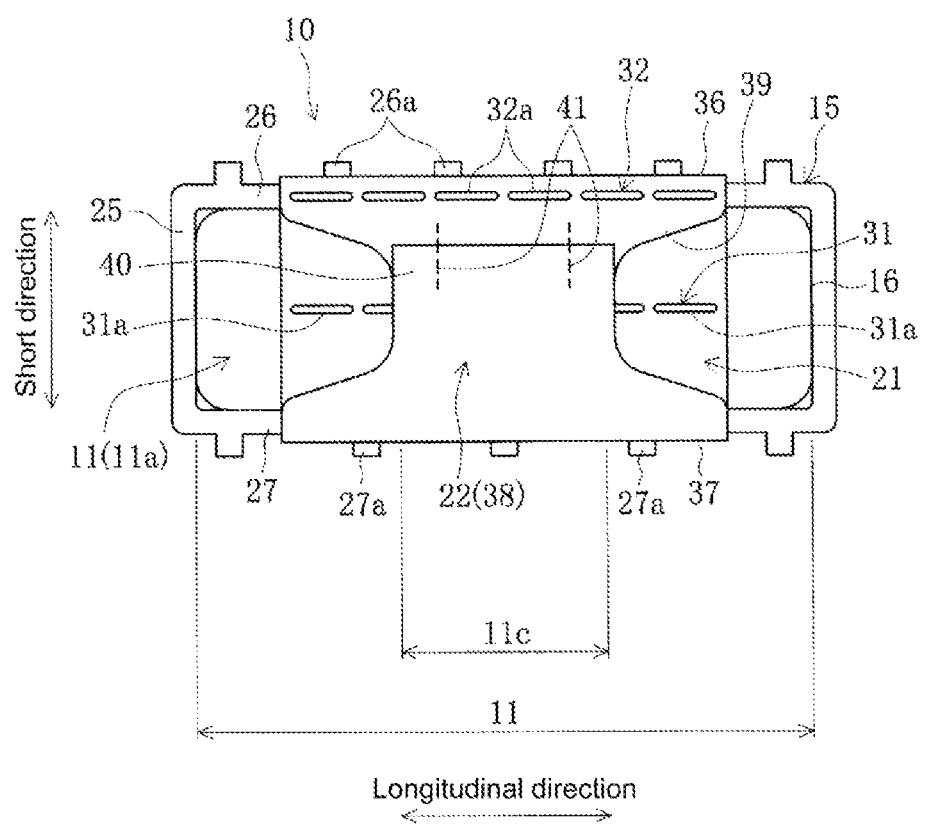
FIG. 10 is a schematic diagram in which a knee airbag device according to a first variation of the embodiment is viewed from the opening part side.

In this variation, as depicted in FIG. 10, the retaining part 41 of the second flap 22 is configured of two stitch parts. Each retaining part 41 extends in the transverse direction of the second flap 22. Each retaining part 41 straddles the overlapping part 40 and a non-overlapping part on an upper side thereof. Each retaining part 41 is spaced a required distance apart in the width direction of the second flap 22.

Second Variation of the Embodiment

Figure 11:
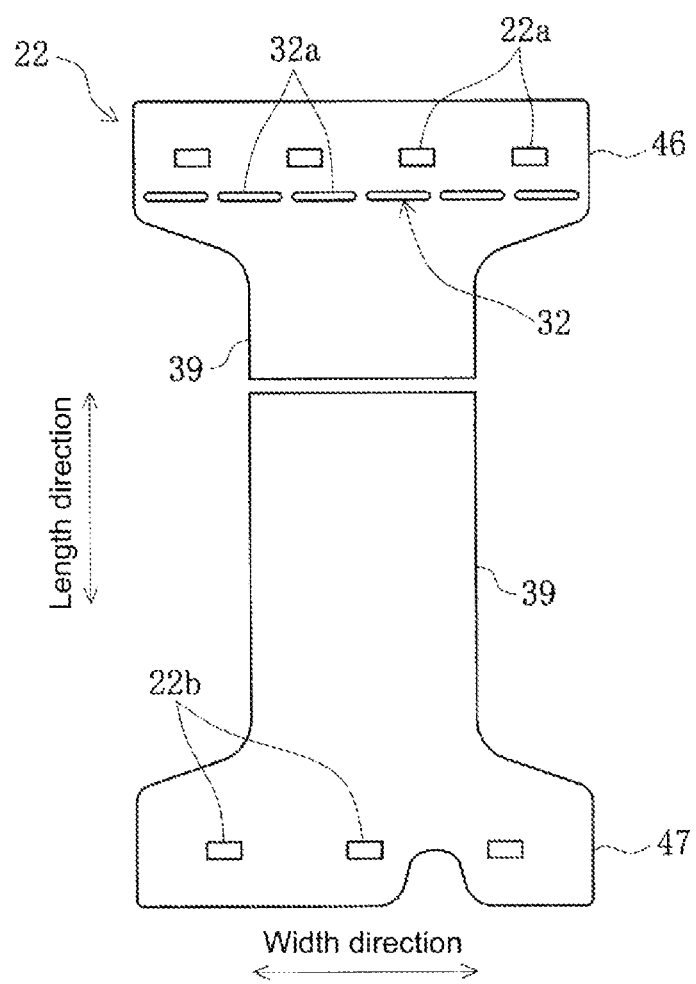
FIG. 11 is a plan view of the second flap before integrating a first fabric and second fabric for a knee airbag device according to a second variation of the embodiment.

In this variation, as depicted in FIG. 11, the second flap 22 is configured by integrating a plurality of pieces of fabric 46, 47. Specifically, the second flap 22 is configured of the first fabric 46 attached to the first flap attachment part 26a and the second fabric 47 attached to the second flap attachment part 27a. The first fabric 46 and the second fabric 47 are integrated, for example, by a stitch part. The stitch part is provided at a point where an end part of the first fabric 46 and end part of the second fabric 47 are overlapped.

Third Variation of the Embodiment

Figure 12:
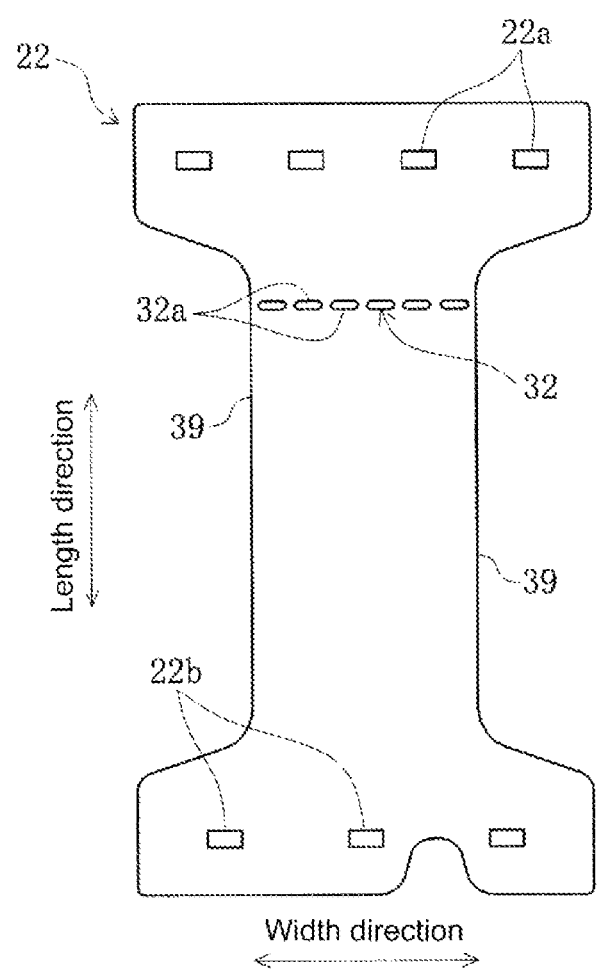
FIG. 12 is a plan view of the second flap of a knee airbag device according to a third variation of the embodiment.

In this variation, the second weak part 32 is formed in the transversing part main body 38a in the second flap 22, as depicted in FIG. 12. The second weak part 32 can be provided, for example, on the first attachment part 36 side.

However, the second weak part 32 may be formed at a different location than in this variation.

Fourth Variation of the Embodiment

Figure 13A:
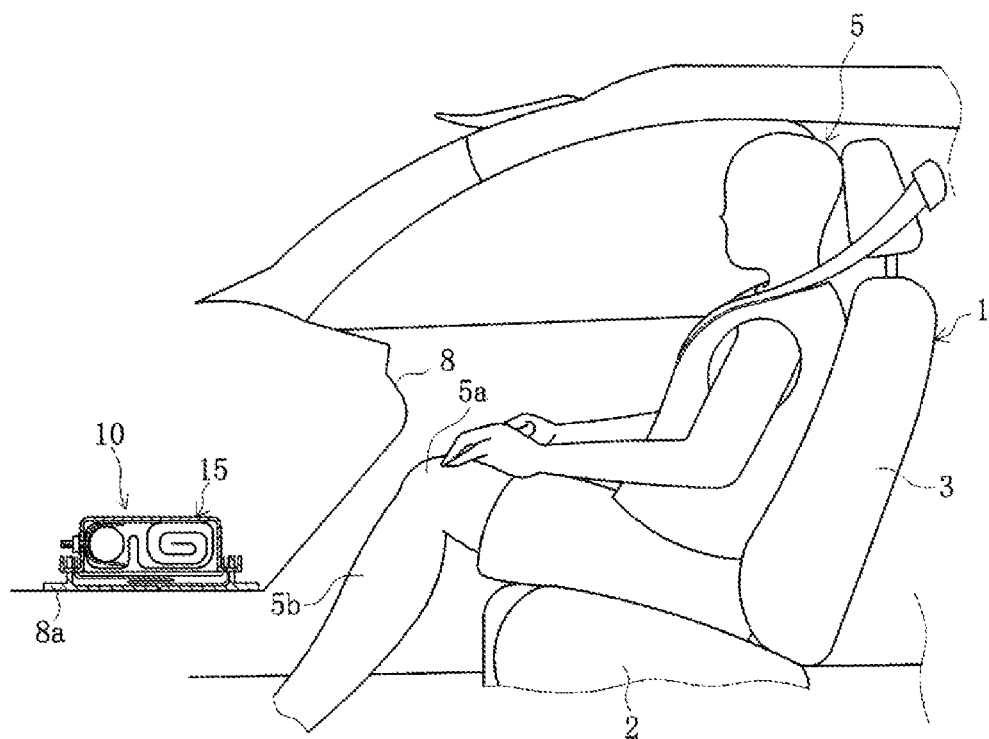
FIG. 13(a) is a schematic diagram depicting a condition in which a knee airbag device according to a fourth variation of the embodiment is attached to a vehicle.
Figure 13B:
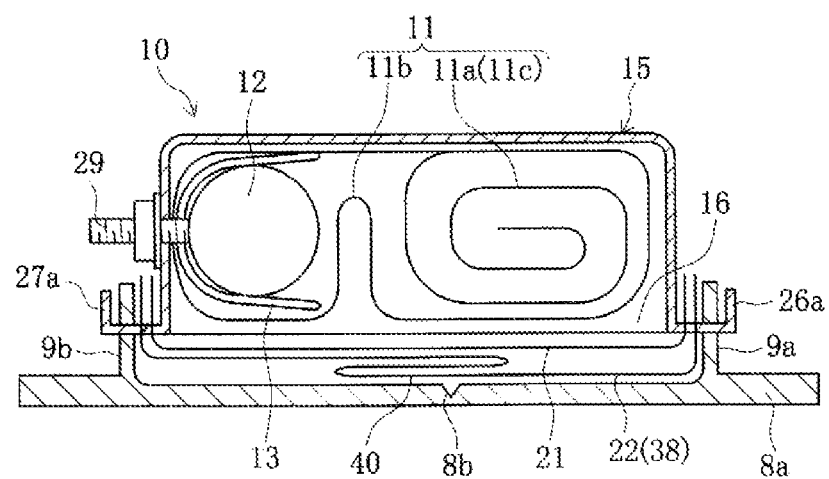
FIG. 13(b) is an enlarged schematic diagram of the knee airbag device.

In this variation, the knee airbag device 10 is a low-mount type device, as depicted in FIG. 13. The opening part 16 of the storage case 15 faces downward and faces the back surface of the lower panel 8a, which extends in the front-rear direction. The first flap 21 transverses the opening part 16 in the front-rear direction. Furthermore, the second flap 22 transverses in the front-rear direction the center part 11c of the airbag cushion 11 in the lateral direction.

Even in this variation, after the airbag cushion 11 begins to expand and deploy, the first weak part 31, the retaining part (stitch part) 41, and the second weak part 32 break in this order. Furthermore, the transversing part 38 of the second flap 21 restrains the deployment of the center part 11c of the airbag cushion 11 until the second flap 22 spreads and the second weak part 32 breaks. This causes the airbag cushion 11 to spread in the lateral direction.

Other Variations

In the embodiment described above, the first flap 21 and the second flap 22 may be attached to mutually different sites in the storage case 15.

In the embodiment described above, the second flap 22 may be a fabric material without a notch 39 (e.g., a fabric material of constant width).

In the embodiment described above, both the first flap attachment part 26a and the second flap attachment part 27a are disposed near the edge part of the opening part 16, but only one of the first flap attachment part 26a and the second flap attachment part 27a may be disposed near the edge part of the opening part 16.

In the embodiment described above, the first weak part 31 may be a configuration other than a slit (e.g., a stitch part).

In the embodiment described above, the second weak part 32 may be a configuration other than a slit (e.g., a stitch part). For example, when two pieces of the fabric 46, 47 are integrated by a stitch part, as in the second variation, the stitch part may configure the second weak part 32 without providing a plurality of slits 32a. In this case, the strength of the stitch part that integrates the two pieces of fabric 46, 47 is such that the airbag cushion 11 approximately simultaneously breaks and restrains the shin 5b when the expansion and deployment of the airbag cushion 11 progresses and the tensile force acting on the second weak part 32 (stitch part) increases after the deployment of the center part 11c of the airbag cushion 11 is suppressed by the second flap 21.

INDUSTRIAL APPLICABILITY

The present invention can be applied to a knee airbag device and the like for protecting a knee of an occupant.

DESCRIPTION OF SYMBOLS

1. Seat
5. Occupant
5a. Knee
10. Knee airbag device
11. Airbag cushion
12. Inflator
15. Storage case
16. Opening part
21. First flap
22. Second flap
31. First weak part
32. Second weak part

The invention claimed is:

1. A knee airbag device for protecting a knee of an occupant, comprising:
   an airbag cushion configured to be stored in front of the knee of the occupant and for expanding and deploying toward the knee side;
   an inflator for injecting expansion gas to expand the airbag cushion;
   a storage case for storing the airbag cushion, in which is formed an opening part through which the airbag cushion that has expanded and deployed by the expansion gas pops out;
   a first flap for covering the airbag cushion exposed through the opening part to transverse in an up-down direction or front-rear direction a center part of the airbag cushion in a lateral direction such that the airbag cushion is retained in the storage case, and having a first weak part that breaks when pressed by the airbag cushion during expansion and deployment; and,
   a second flap, which is a component with a larger dimension in a length direction than the first flap, for covering an outer surface of the first flap so as to transverse in the up-down direction or front-rear direction a center part of the airbag cushion in the lateral direction, the second flap having a second weak part between a first end of the second flap and a second end of the second flap, wherein the second weak part breaks when pressed by the airbag cushion after rupture of the first weak part.

2. The knee airbag device according to claim 1, wherein notches are formed on both sides of the second flap in a width direction at the transversing part that transverses the center part, which notches are recessed toward the center in the width direction.

3. The knee airbag device according to claim 2, wherein the notches are formed in a shape recessed in a curved manner toward the center in the width direction in a front surface view of the opening part.

4. The knee airbag device according to claim 1, wherein the second flap has a pair of attachment parts for attaching the second flap to a vehicle side and a transversing part extending between the pair of attachment parts and transversing the center part;
   one of the pair of attachment parts is attached to a first flap attachment part provided on one side of the transversing part in a transverse direction of the storage case; and,
   the other of the pair of attachment parts is attached to a second flap attachment part on the other side in the transverse direction of the storage case.

5. The knee airbag device according to claim 4, wherein one end side of the first flap is attached to the first flap attachment part; and,
   the other end side of the first flap is attached to the second flap attachment part.

6. The knee airbag device according to claim 4, wherein at least one of the first flap attachment part and second flap attachment part is disposed near an edge part of the opening part.

7. The knee airbag device according to claim 4, wherein the second flap is configured by integrating a first fabric attached to the first flap attachment part and a second fabric attached to the second flap attachment part.

8. The knee airbag device according to claim 1, wherein the first flap is provided so as to transverse the opening part, and in the transverse direction of the first flap, the first weak part is positioned at or near the center of the opening part.

9. The knee airbag device according to claim 1, wherein the second weak part is positioned near the edge part of the opening part.

10. The knee airbag device according to claim 1, wherein in the second flap, the transversing part that transverses the center part has an overlapping part where the transversing part is folded back a plurality of times in the length direction so as to overlap upon itself.

11. The knee airbag device according to claim 10, wherein the overlapping part has a stitch part in which the fabric of the mutually overlapping part of the transversing part is stitched together such that the folded state is maintained; and, the stitch part breaks before the second weak part.

\* \* \* \* \*